S. A. CROWDER.
SPROCKET DRIVING MECHANISM.
APPLICATION FILED JUNE 12, 1909.
984,509.
Patented Feb. 14, 1911.
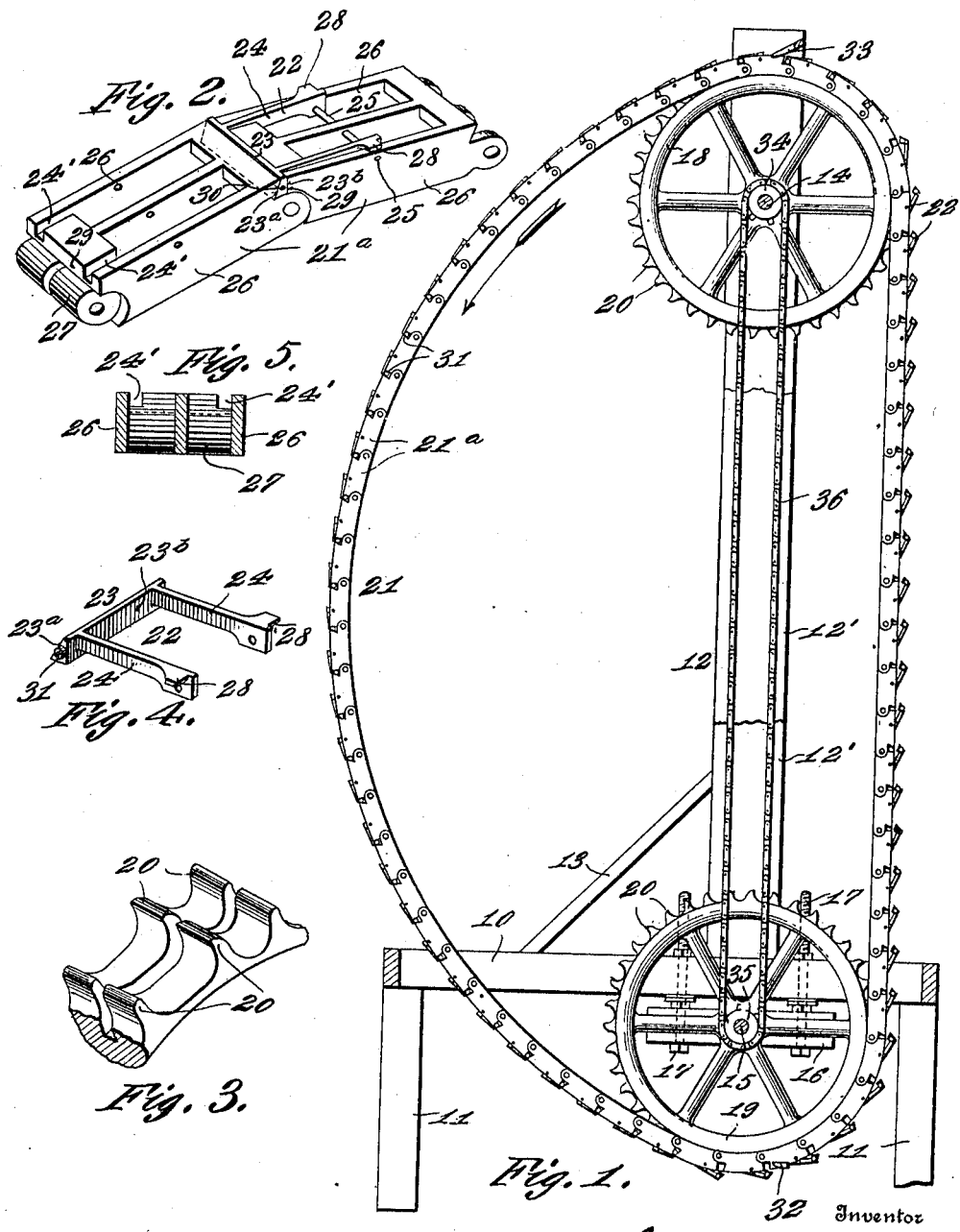

UNITED STATES PATENT OFFICE.

SAM A. CROWDER, OF MADILL, OKLAHOMA.

SPROCKET DRIVING MECHANISM.

984,509.  Specification of Letters Patent.  Patented Feb. 14, 1911.

Application filed June 12, 1909. Serial No. 501,770.

*To all whom it may concern:*

Be it known that I, SAM A. CROWDER, a citizen of the United States, residing at Madill, in the county of Marshall and State of Oklahoma, have invented certain new and useful Improvements in Sprocket Driving Mechanisms, of which the following is a specification.

This invention relates to sprocket driving mechanism, and has particular reference to the details of construction hereinafter fully described and claimed and illustrated in the accompanying drawings, in which:

Figure 1 is a side elevation of a device made in accordance with this invention; Fig. 2 is a detail of a pair of connected links of the chain; Fig. 3 is a detail perspective indicating the form of sprocket teeth coöperating with the peculiar form of chain links; Fig. 4 is a detail of the locking dog hereinafter described, and Fig. 5 is a cross sectional detail of one of the chain links.

Throughout the following description and on the several figures of the drawings, similar parts are referred to by like reference characters.

Carrying out the invention in a practical embodiment thereof there is provided a frame 10 supported in any suitable manner, as by legs 11. A tower or support 12 extends upwardly from the frame 10 and may be braced by braces 13 so as to maintain a proper rigid relation therewith. The tower embodies a plurality of standards or beams 12' which carry in suitable bearings at their upper end a horizontal shaft 14. A shaft 15 parallel to the shaft 14 is mounted in bearings carried by auxiliary frame members 16 adjustable vertically by means of bolts 17 with respect to the main frame 10, so as to vary the distance between the shafts 14 and 15 as may be required. The shafts 14 and 15 have rigidly connected thereto sprocket wheels 18 and 19, respectively, the wheels being in the same vertical plane. The sprocket wheels are provided with sets of sprocket teeth 20.

The chain 21 comprises an endless series of links 21ª of peculiar form, and said chain is designed to operate over said wheels 18 and 19. It is contemplated within the scope of this invention that the links throughout a portion of the chain shall be caused to assume a curved form of greater or less convexity when not in contact with the sprocket wheels. At another portion of the chain, the form thereof will be substantially straight between the wheels. Any suitable mechanism may be provided in connection with the chain links to cause them to assume the curved form referred to. As shown particularly in Fig. 2, each link is provided with a gravity operating dog 22, which is pivoted to the link and is adapted at a certain point in the operation of the machine to gravitate into the joint between said link and the one just in advance thereof. The dog 22 comprises a head 23 having plane faces opposed to each other, the forward plane face 23ª being disposed at an acute angle with respect to the rear face 23ᵇ. A pair of arms 24 extend rearwardly from the face 23ᵇ and are pivoted at their rear ends by means of pivot pins 25 to the side bars 26 of the link. The arms 24 when in closed position are adapted to enter grooves 24' of the link to permit the head 23 to drop well inwardly toward the hub 27 of the link. The arms 24, furthermore, are provided with outwardly extending stop lugs 28, which coöperate with the upper edges of the side bars 26 to limit the outward swinging movement of the dog. The link is provided just outside of the hub 27 with a shoulder 29, against which tne face 23ᵇ of the dog is adapted to rest snugly, and the rear end of the link in advance is provided with a face 30 adapted to impinge against the face 23ª of the dog, whereby the links will be prevented from partaking of relative movement in one direction. The amount of angularity between the faces 23ª and 23ᵇ of the dogs will determine the form which the curved portion of the chain will assume between the sprocket wheels 18 and 19. The dogs will not prevent the usual operation of the sprocket links around the sprocket wheel assuming that the chain is moving in the direction indicated by the arrow. As the links coöperate with the sprocket wheel 19 and are caused thereby to flex, the dogs 22 will be free to drop downwardly or out of locking engagement with the links. Said dogs will then remain in their outward position until the links reach and pass partially around the wheel 18. By virtue of the lugs 28, the dogs will be held in such a position that a very slight movement of the links out of the vertical plane will cause the mass of the dogs to pass over the centers of the pivot pins 25 and drop into their inward position where they will cause the locking effect above described. The coöperation of the shouldered ends 30 and 29 of the adjacent links will positively prevent displacement of the dogs except as above indicated.

In order to insure the proper operation of the dogs as above described, it may be necessary or desirable in some instances to provide auxiliary mechanism to cause positive operation thereof. A simple form of such auxiliary mechanism may include a lug 31 extending laterally from each dog which will coöperate with a stationary cam 32 adjacent the wheel 19, whereby if for any reason gravity should fail to swing the dog the cam will cause the dog to swing outwardly. Also a stationary cam 33 may be provided adjacent the wheel 18 at the point where it is necessary that the dogs shall be dropped into locking position, said cam 33 being adapted to coöperate with the lug 31 to cause such operation positively. Of course, if gravity is sufficient to cause the proper movement of the dogs, the cams will not be called upon to perform such function.

In order to maintain the proper operative relation between the wheels 18 and 19, the shafts 14 and 15 may be equipped with auxiliary sprocket wheels 34 and 35, respectively, connected by an endless chain or belt 36.

Having thus described the invention, what is claimed as new is:—

1. In a sprocket driving mechanism, the combination of a sprocket chain, the links of which are free to flex in one direction, and means movably connected to the links to limit the flexing thereof in the other direction.

2. In combination, an endless series of sprocket links, and means movable into and out of the joints of said links for the purpose specified.

3. In combination, an endless series of sprocket links, said links having opposing shoulders, and a series of dogs movable into and out of the spaces between said shoulders at different points of the movement of the chain.

4. The combination of a pair of sprocket wheels, a sprocket chain coöperating therewith and comprising a plurality of articulated links, one portion of the chain between the wheels being substantially straight, the links being so constructed as to automatically cause another portion of the chain between the wheels to assume a curved form as the chain progresses.

5. In combination, a pair of sprocket wheels, a sprocket chain coöperating therewith, one portion of the chain between the wheels being substantially straight and flexible, and means to cause another portion of the chain between the wheels to assume a curved and rigid form.

6. In combination, a pair of parallel shafts, a pair of sprocket wheels connected thereto in the same plane, a sprocket chain coöperating with said wheels, a series of dogs coöperating with the links of the chain in the manner set forth, and auxiliary mechanism connected with said shafts to maintain the proper operative relation between said wheels.

In testimony whereof I affix my signature in presence of two witnesses.

SAM A. CROWDER.

Witnesses:
   Geo. M. Jones,
   E. T. Haddock.